United States Patent
Madan et al.

(10) Patent No.: US 11,644,993 B2
(45) Date of Patent: *May 9, 2023

(54) MULTI-THREADED DYNAMIC PER-FILE READ-AHEAD CACHE FOR DEDUPLICATION SYSTEM

(71) Applicant: EMC IP Holding Company, LLC, Hopkinton, MA (US)

(72) Inventors: Nitin Madan, Haryana (IN); Kedar Sadanand Godbole, Pune (IN)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/446,270

(22) Filed: Aug. 27, 2021

(65) Prior Publication Data
US 2021/0389892 A1    Dec. 16, 2021

Related U.S. Application Data (63) Continuation of application No. 16/389,260, filed on Apr. 19, 2019, now Pat. No. 11,150,826.

(51) Int. Cl.
*G06F 3/06* (2006.01)
*G06F 9/38* (2018.01)

(52) U.S. Cl.
CPC ............ *G06F 3/0641* (2013.01); *G06F 3/061* (2013.01); *G06F 3/0673* (2013.01); *G06F 9/3851* (2013.01)

(58) Field of Classification Search
CPC .... G06F 16/1748; G06F 3/061; G06F 3/0611; G06F 3/0641; G06F 3/0659; G06F 3/0673; G06F 3/0683; G06F 9/3851
See application file for complete search history.

(56) References Cited

U.S. PATENT DOCUMENTS 10,346,360 B1 *  7/2019  Basov ................... G06F 16/182

* cited by examiner

*Primary Examiner* — Yong J Choe
(74) *Attorney, Agent, or Firm* — Barry N. Young (57) ABSTRACT

A multi-stream restore method for reducing restore time of file data to service an external read request for file data stored by a data deduplication system employs a per-file read-ahead cache that is populated by multiple parallel internal read-ahead streams. The number of parallel read-ahead streams is dynamically variable based upon processing conditions and a set of heuristically pre-determined criteria that characterize the file data including a data access pattern that is sequential and a processing load that is below a predetermined threshold. Processing conditions are periodically monitored and adjustments to the multi-stream data access are made to optimize performance.

16 Claims, 7 Drawing Sheets

MULTI-THREADED DYNAMIC PER-FILE READ-AHEAD CACHE FOR DEDUPLICATION SYSTEM

CROSS REFERENCE TO RELATED APPLICATIONS

This application is a continuation of U.S. application Ser. No. 16/389,260, filed Apr. 19, 2019, the disclosure of which is incorporated by reference herein.

BACKGROUND

This invention relates generally to accessing data files from large data deduplication filesystems, as for restore operations, and more particularly to a system and method for multi-threaded read-ahead data access to increase access speed and reduce input/out ("I/O") costs.

In many filesystems, sequential data restores are serialized. One way to increase access speed and amortize overhead costs of I/Os in these filesystems is to anticipate sequential data reads and issue prefetch requests (also called "read-aheads") for the anticipated data. Such prefetch requests are treated as hints, and the data corresponding to these read requests are stored in buffers, referred to as a "read-ahead caches", from which the next sequential data reads are serviced.

In large backup storage filesystems, new generations of backups are written frequently. Thus, over time the locality of file data deteriorates in deduplication environments. The serialization of reads compounds the effects of bad locality and causes further degradation in restore performance. The reads on data deduplication systems are typically few and far between. They are normally to restore the backups, and most of the time, the reads are sequential reads. Restores for files with bad locality are slow because of the serialization and the need for multiple I/Os to service a request. This makes restores more time-consuming, and resource and I/O costs are greater.

It is desirable to provide systems and methods that avoid the foregoing and other problems associated with file restores from large data storage filesystems by reducing the time and I/O overhead required for restoring files so that restores become faster and more efficient.

The invention addresses these and other associated problems associated with data restores by affording a system and method that dynamically changes file accesses such as the number of read-ahead threads based upon predetermined rules that relate to, among other things, prevailing conditions within the filesystem and the data file being accessed so that file accesses and restores are optimized.

DESCRIPTION OF PREFERRED EMBODIMENTS

The invention is particularly advantageous in accessing data files in a data deduplication filesystem, as for a restore operation, and will be described in that context. However, as will become evident from the following, this is illustrative of only one utility of the invention, and it will be appreciated that the invention has broader utility and that it may be used to advantage for data access in other types of filesystems and for other types of applications.

As will be described in more detail herein, in one aspect the invention optimizes access to file data by reducing access times by servicing external read requests for file data using a per-file read-ahead cache that may be continuously enabled and populated by multiple parallel restores when the system has sufficient resources and capability. If the data access pattern is sequential and the system has the capability, corresponding multiple read-aheads may be issued. To service an external read request for data, the read-ahead cache may be populated by a dynamically varying number of multiple internal read-ahead threads that correspond to the one external read stream. The number of read-aheads issued depends upon certain prevailing system processing conditions and predetermined heuristically determined criteria or rules (referred to also herein as heuristics). To afford parallelism for the internal reads, the read-ahead cache is operated at a greater offset than a current read offset, and the internal reads may be distributed across the multiple streams. The read-ahead threads work in parallel on portions of a file referred to as chunks, and the number of threads may be dynamically changed, e.g., threads may be turned on and off, as conditions change, as will be described. This enables data accesses and I/Os to be optimized, while giving a multi-streamed advantage to certain data reads. This approach is referred to herein as a multi-stream restore ("MSR").

Figure 1:
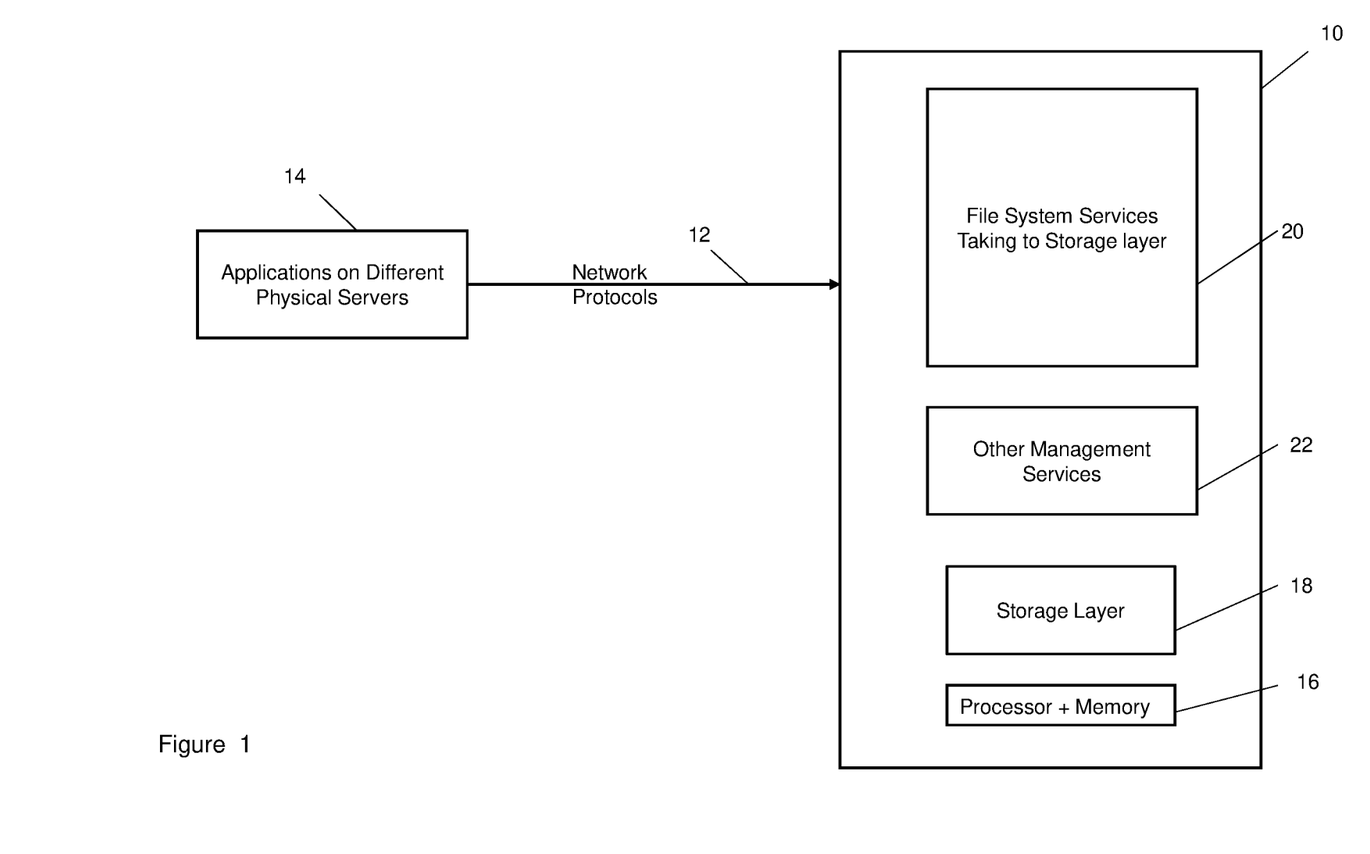
FIG. 1 is a diagrammatic view of an exemplary system of the type in which the invention may be used.

FIG. 1 is a high-level functional block diagram of a system of the type in which the invention may be practiced. The system may be part of a networked data deduplication storage system, such as is available from DataDomain, a subsidiary of the assignee of the present invention. The system may comprise a purpose built backup appliance ("PBBA") node 10 that is interfaced via a network 12 to a plurality of servers or clients 14 running different applications. Node 10 may comprise a processor which serves as a data deduplication ("DDUP") engine and a memory 16. The memory may store computer executable instructions which control the processor to perform the functions and operations described herein, and may additionally afford in-memory data structures that serve as read-ahead caches for servicing different read requests for file data.

The node may additionally comprise a storage layer 18, e.g., comprising a plurality of data storage devices such as disks that serve as a content store, a data deduplication filesystem ("DDFS") 20 that provides filesystem services which communicate with the storage layer, and other management services 22. The DDFS PBBA file system is designed primarily for writes and to have a few very large files.

There are typically few restores on a DDFS filesystem. The restores are principally to restore backups, and they are normally sequential. The requests (in PBBA restores) are serialized. Additionally, filesystem developers frequently try to tune the filesystem for maximum throughput at a given number of concurrent streams. If the number of streams is lower than the maximum throughput number of streams the performance is usually sub-optimal. Restores, as mentioned above, are few and far between. But when they happen, they are important actions on the system. Serial execution of read requests, together with a fixed prefetch horizon makes sub-optimal use of the I/O bandwidth.

Figure 2A:
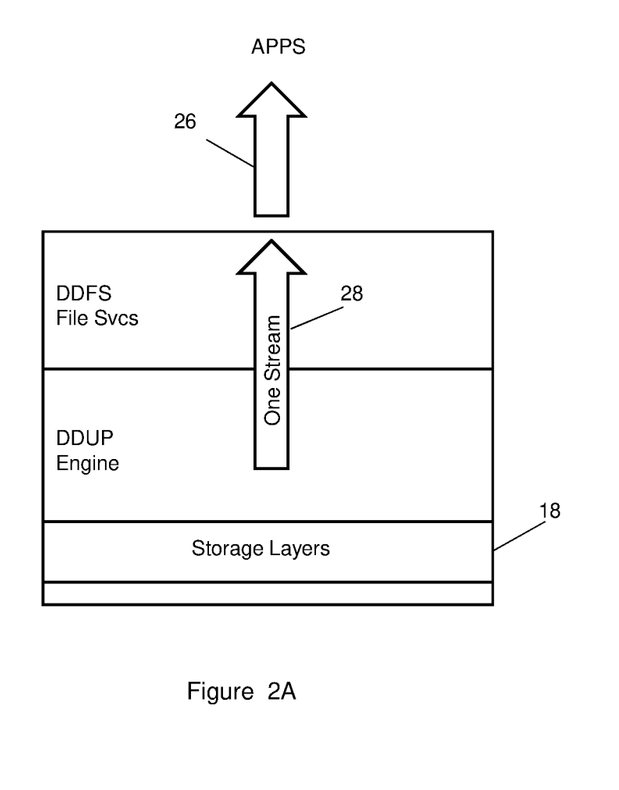
FIGS. 2A and 2B illustrate two different patterns of data access from a data deduplication filesystem, FIG. 2A illustrating a single data stream access, and FIG. 2B illustrating a multi-stream access.
Figure 2B:
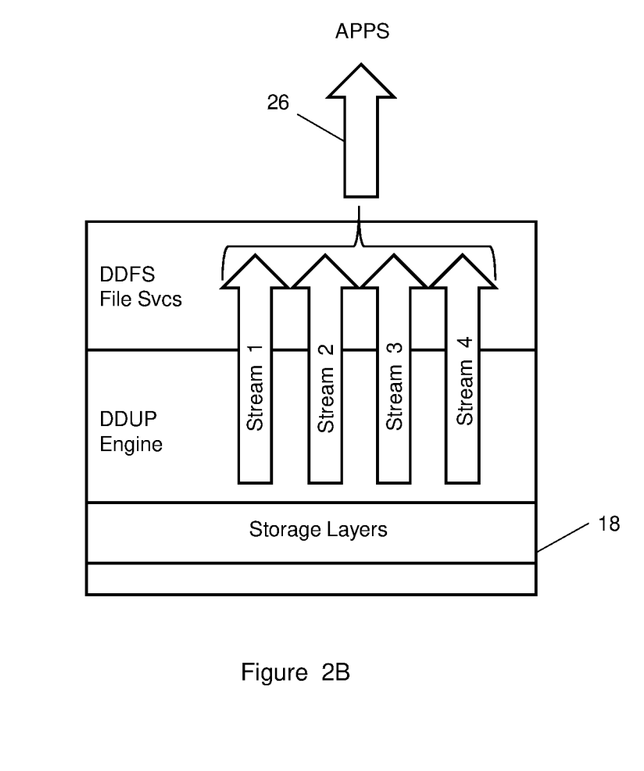

FIGS. 2A and 2B illustrate application reads that access data in the storage layers 18 in response to an external read request 26 for file data from an application. FIG. 2A shows a single stream internal read thread 28 responding to the read request 26, and FIG. 2B shows multiple internal read threads (Steams 1-4) in a multiple stream restore (MSR) operation responding to a read request 26. As will be described, to service a read request the invention may dynamically change from a single internal read thread to multiple read threads in order to optimize use of available system resources.

However, by being generically sized for maximum throughput, the system is still serialized by the requests and the locality on disk. The invention addresses this by affording parallel restores when the system has sufficient resources. The external reads are serviced by the read-ahead per file cache, as shown in FIG. 3.

Figure 3:
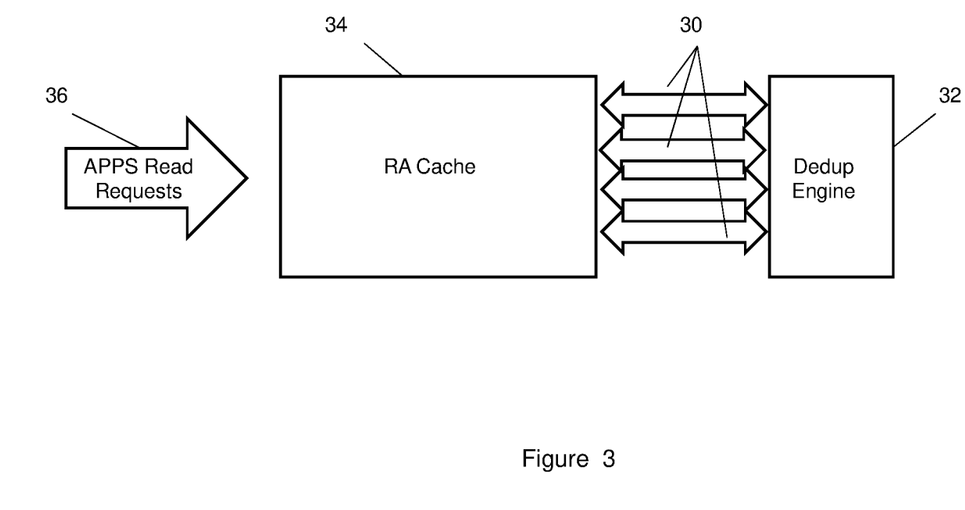
FIG. 3 is a diagrammatic view of a multi-stream read-ahead cache in accordance with the invention.

FIG. 3 illustrates diagrammatically a MSR operation in which multiple internal read streams (threads) 30 access data in a deduplication engine 32 to populate a read-ahead cache 34 to service an external application read request 36. Multiple internal read streams may be opened corresponding to the external read request, and the internal reads may be distributed across these multiple internal read streams. As previously described, and as will be described further, the number of streams to populate the read-ahead cache may vary dynamically depending upon the prevailing operating conditions and heuristically pre-determined rules and criteria that control the number of read streams enabled. The criteria, as will be described, are designed to optimize data access time to afford quick restores, and to minimize the I/O overhead costs.

Figure 4:
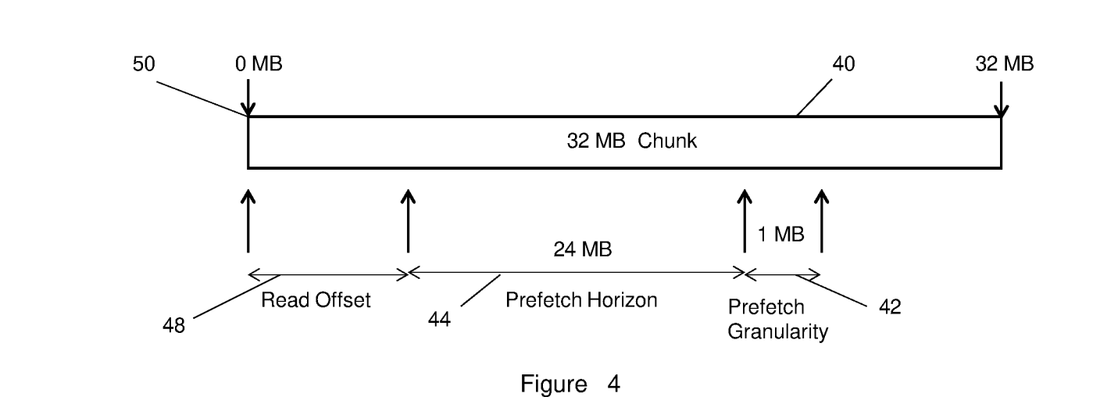
FIG. 4 is a diagrammatic view of a process in accordance with the invention for reading data in a data chunk unit.

The read ahead cache 34 of FIG. 3 being filled in by the multiple internal read streams 30 affords the desired parallelism. Each internal read thread preferably reads a data increment within a section of the file which is referred to as a chunk, where increments and chunks have preselected ranges (sizes). As an illustration, FIG. 4 shows an example of a chunk 40 having a range of 32 MB, and a read increment 42 (referred to as a prefetch increment) having a granularity size of 1 MB. In the figure, the read increment may begin at a point within the chunk at a prefetch horizon 44 (a parameter of the filesystem), as e.g., at 24 MB, measured within the chunk from the end of a read offset 48 that is measured from a starting position 50 of the chunk. The prefetch horizon specifies how far from the read offset the prefetch increment begins. Once an internal read thread has completed reading its chunk, the internal read thread may move to a next designated chunk, which may not be the next contiguous section of the file to be read. Rather, the next designated chunk may be determined as:

next chunk offset=current chunk start offset+(number of internal threads*chunk size)

This is illustrated by the following example.

Figure 5:
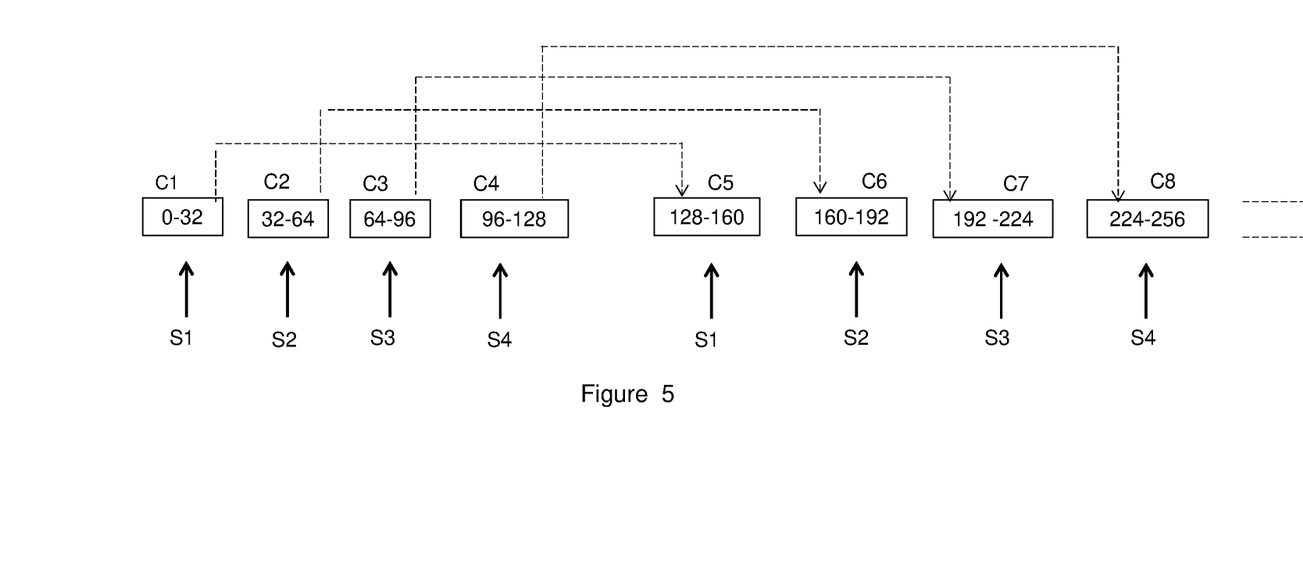
FIG. 5 is a diagrammatic view illustrating a multi-stream process in accordance with the invention for reading a data file in a filesystem.

Referring to FIG. 5, assume that there are four read streams, S0-S3, and the chunk size is 32 MB as shown in FIG. 4. Assume further that the first stream S0 reads a first chunk C0 (0-32 MB). The second stream S1 reads the next second chunk C1 (32-64 MB); the third stream S2 reads the next third chunk C2 (64-96 MB); and the fourth stream S3 reads the next fourth chunk C3 (96-128 MB). After stream S0 completes reading C0, S0 then reads the next chunk C4 (128-160 MB) to be read, as indicated by the dotted line. Similarly, stream S1 next reads C5; S2 next reads C6; and S3 next reads C7, as shown.

In accordance with the invention, the RA cache for multi-stream read (MSR) operation is preferably not automatically enabled, i.e., MSR is not enabled upon an external read request first being received. Rather, MSR is preferably enabled based upon the prevailing operating (processing) conditions at that particular time and upon a set of predetermined rules (criteria). An example of a rule for enabling MSR may be if the reads are sequential and if the file size is greater than a predetermined minimum size, the RA cache may be enabled for MSR. A non-exclusive set of criteria that the invention may employ singularly or in combinations for enabling and/or controlling MSR during operation includes the following:

Sequential access pattern: MSR is enabled if the read access pattern is sequential;

File size: MSR is enabled if the file size is greater than a predetermined threshold (e.g., 10 GB) because setting up MSR is time consuming and it is preferably avoided unless the performance benefit outweighs the costs;

Tier of storage: the I/O bandwidth for certain storage tiers may be too small to waste CPU resources on MSR, so MSR is not enabled for reads from these tiers;

Read Offset: a minimum read offset (e.g., 100 MB) may be set for enabling MSR; sequential read requests; and to eliminate false positives;

Number of streams: the system may be sized for processing a maximum number of streams; an additional stream may exceed this number and slow read access;

Back-off mechanism and time check: to avoid the costs associated with testing all rules on each read request; upon a test failing for a stream, a back-off factor n (e.g., an incrementing integer) may be set to establish a retry time before a retry is permitted in n*t seconds(s) (e.g., t=10 s); the first time a test fails, the back-off factor may be set to one, and retry may be set to 10 s; the second back-off factor may be two and retry is 20 s, etc. This amortizes the cost of heuristic checks to near zero;

System load: the RA cache and MSR may not be activated on a stream if the system processing load exceeds a predetermined threshold.

In addition, the RA cache may monitor system processing load and it may disable itself if the system load increases beyond the predetermined threshold. Otherwise, continued operation may have deleterious effects on other performance of the system, such as ingest or replication. This may be achieved, in one embodiment, by monitoring system processing operations, as, for instance, by polling the system load periodically, or by registering call-backs into a quality of service (QoS) subsystem. Some characteristics that may be monitored include, for example, the number of active reads and writes (streams) on the system, CPU usage, or disk or I/O responses, among others, that occur within a preselected period of time.

Figure 6:
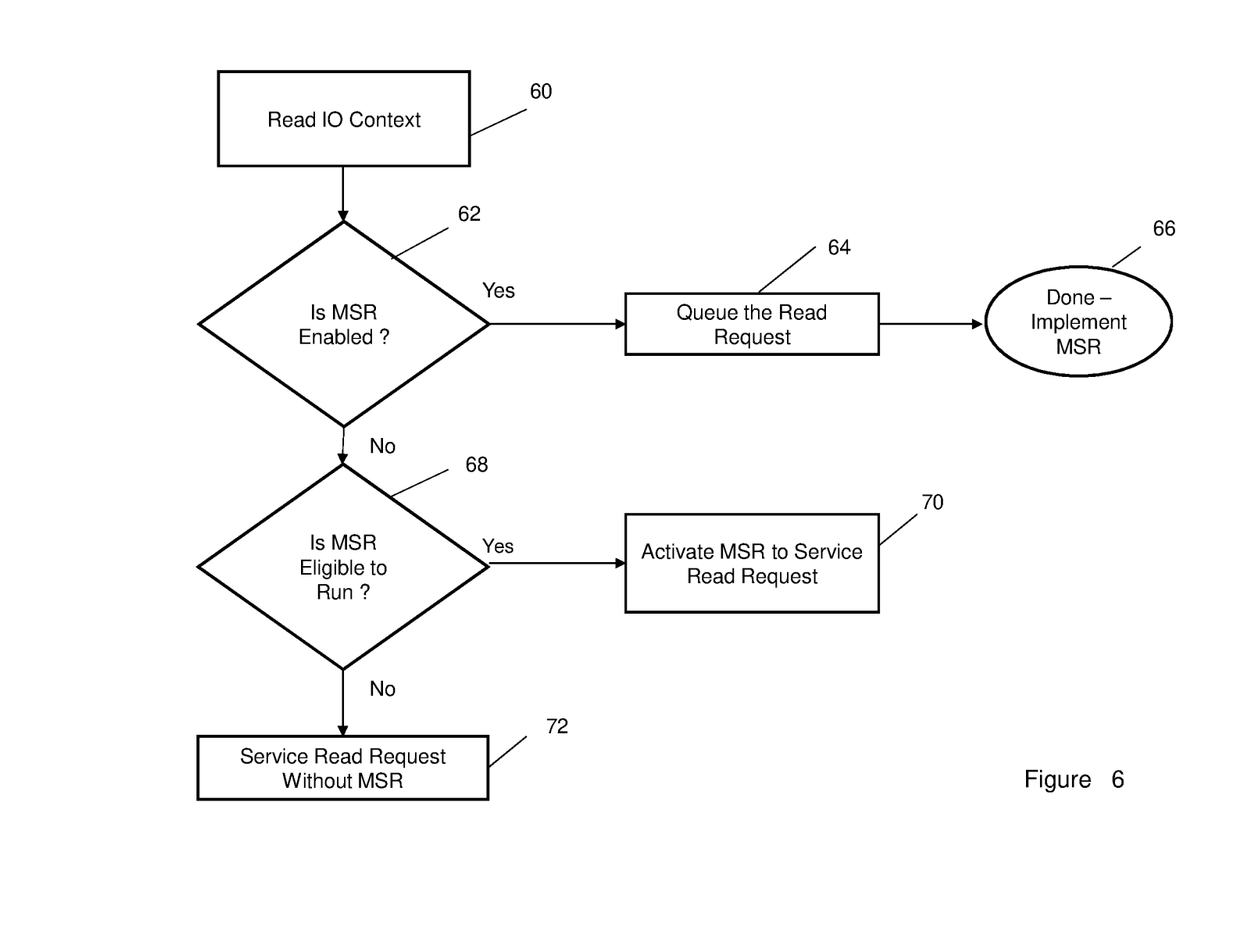
FIG. 6 is a diagrammatic view of a process in accordance with the invention for determining whether a filesystem data access process will be single stream or multi-stream.
Figure 7:
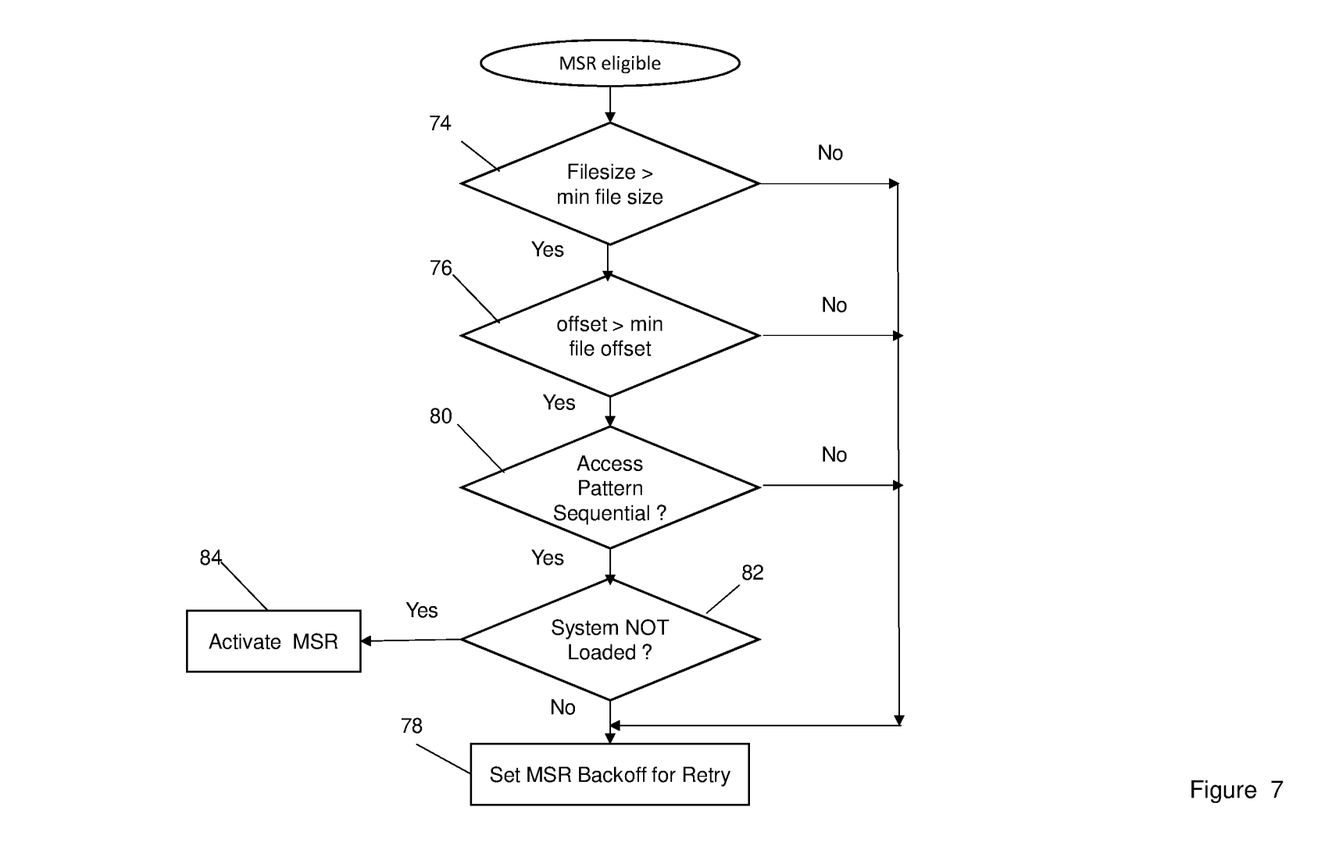
FIG. 7 is a diagrammatic view illustrating a portion of the process of FIG. 6 in more detail.
Figure 8:
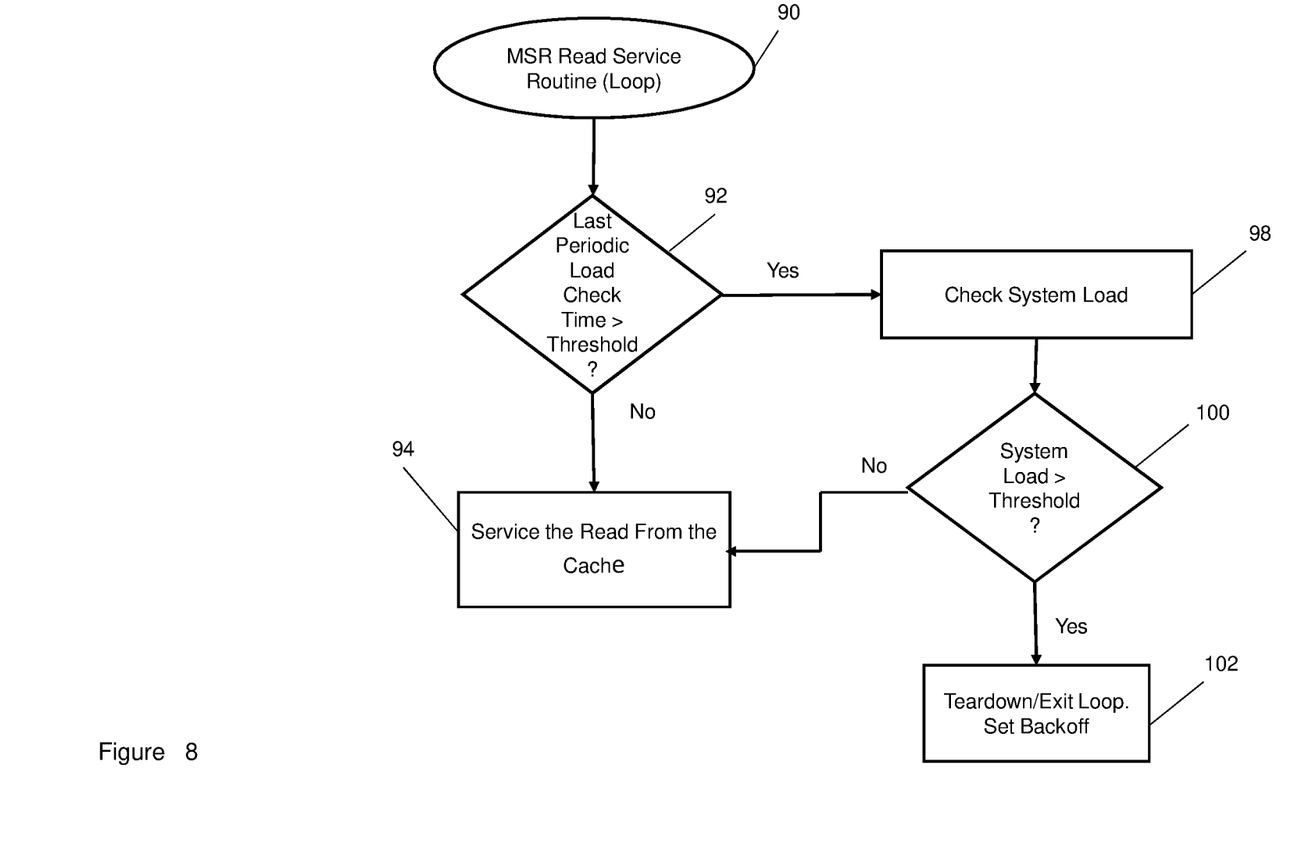
FIG. 8 is a process in accordance with the invention for periodically monitoring a filesystem to determine whether to service filesystem reads using a multi-stream or single stream process.

FIGS. 6-8 are functional flow diagrams that illustrate processes in accordance with the invention for enabling, monitoring and controlling MSR operations in a data storage system such as shown in FIG. 1.

FIG. 6 is a diagrammatic view of a process in accordance with the invention for determining whether a filesystem data access process will be single stream or multi-stream in responding to an external read request. The process may be performed by a processor of the PBBA, for example, executing computer readable instructions stored in the associated memory.

Referring to FIG. 6, at 60 a request for a read may be received from an application. At 62, it is determined whether MSR is already enabled. If it is, the received read request is queued at 64 for execution as a multi-stream restore, and the initial determination ends at 66. If instead at 62 MSR is not enabled, at 68 the process determines whether MSR is eligible to be enabled as by determining the system operating conditions and by applying rules such as described above, as will be described below in connection with FIG. 7. If, at 68, it is determined that MSR is eligible to be enabled, at 70 MSR is activated and then received read request is serviced as a MSR using multiple internal read streams to populate the RA cache with file data, from which the file data is returned to the requesting application. If instead at 68 it is determined that MSR is not eligible, e.g., because of current system load, the read request is serviced at 72 without MSR as a single stream.

When read requests begin arriving, they may be initially serviced by single stream reads. FIG. 7 illustrates a process for determining whether to establish MSR when a read arrives. It also illustrates the step 68 of the process of FIG. 6 that determines whether MSR is eligible to service the received read request.

In the embodiment of the process shown in FIG. 7, a number of criteria must be satisfied in order to activate MSR. As shown, at 74 a first criterion that must be satisfied may be whether the file size is greater than a predetermined minimum file size. As explained above, setting up MSR is costly and time consuming. Unless the file size is greater than a minimum size, such as 10 GB, the increased performance benefits of MSR may not justify the cost and time of MSR for file sizes that are less than the predetermined minimum size. If the file size meets this criterion, the process proceeds to step 76. If not, the process exits to step 78 without setting MSR and services the read request using a single stream read of the content store. It also sets at 78 a predetermined backoff factor and time, as described above, to re-execute the loop of FIG. 7 to recheck for eligibility of MSR.

At step 76, the process determines whether the second criteria is satisfied, for instance one that requires that the file offset be greater than a predetermined minimum file offset, e.g., 100 MB. This permits looking back to determine the file access pattern in order to determine whether to enable MSR. If the file offset criterion is not satisfied, the process proceeds to step 78 as described above. If the file offset criterion is satisfied, the process continues to step 80 where it is determined if the file read access pattern is sequential in order to activate MSR. If the access pattern is not sequential, the process exits to step 78. If this file access criterion is satisfied at step 80, the process proceeds to step 82 where the fourth criterion determines whether the system is not loaded above a predetermined threshold. If it is not so loaded, the process proceeds to step 84 and activates MSR. Otherwise, the process exits to step 78 to set a MSR backoff for retry.

The set of criteria used in the process of FIG. 7 for deciding whether to enable MSR have been determined heuristically to be useful, and they are exemplary. Other different criteria and different numbers of criteria may be employed in addition or in substitution to those shown, such as, for example, the storage tier of the file data requested, and the number of streams in use relative to the maximum permissible number based upon the system capabilities. Moreover, in an embodiment, the process of FIG. 7 may be repeatedly executed at predetermined time intervals to check for MSR eligibility based upon the system load and other conditions such as the parameters of the file that is the subject of the external read request in order to optimize the processing capability of the system. This is illustrated in FIG. 8.

FIG. 8 shows a flow diagram of a process for periodically re-executing the MSR read service process to monitor whether the system load exceeds a predetermined threshold to continue or exit MSR.

Referring to FIG. 8 at 90 the process begins the MSR service routine loop process. At 92, a check is made to determine whether the time since a last load check exceeds a predetermined threshold. If the time threshold does not exceed the threshold, the process proceeds to step 94 where the external read request is serviced from the cache. On the other hand, if at 92 the time does exceed the time threshold, the system load is checked at 98 and at 100 it is determined whether the system load exceeds a predetermined threshold load. If it does not, the process proceeds to step 94 where the read request is serviced from the cache. If the system load does exceed the threshold, at 102 the process exits (teardowns) the MSR loop and reverts to a single stream read.

The processes of FIGS. 7 and 8 may be modified to incorporate steps that dynamically adjust the number of multi-stream reads in real time based upon the system load and other operating conditions such as the parameters of the files being read.

While the foregoing description has been with reference to particular embodiments, it will be appreciated by those skilled in the art that changes from these embodiments may be made without departing from the principles of the invention, the scope of which is defined by the appended claims.

The invention claimed is:

1. A method of improving access time of sequential data in a file in a storage layer of a data system to service an external read request for a data restore, comprising:
   opening multiple internal read-ahead streams that read ahead in parallel data in increments of a chunk of said file in said storage layer to prefetch said data;
   dynamically varying, to optimize processing and speed of said data access, the number of said multiple read-ahead streams that read said data or a prefetch horizon of the data read by each said read-ahead stream based upon the present system processing conditions and based upon a set of preselected criteria applicable to characteristics of the file being read;
   populating a cache with the data read by said multiple read-ahead streams; and
   servicing said external read request with the data populated in the cache.

2. The method of claim 1 further comprising confirming, prior to opening said multiple read-ahead streams that the size of said file being accessed is greater than a predetermined threshold size below which size the costs of setting up said multiple read-ahead stream access exceed the performance benefit obtained from multiple read-ahead stream access.

3. The method of claim 1, wherein said preselected criteria include said file data being stored in a storage tier having an input/output (I/O) bandwidth that is smaller than one at which the processing resource costs required for multiple stream reading exceed the performance benefit obtained.

4. The method of claim 1, wherein said present system processing conditions comprise a system processing load below a predetermined threshold load corresponding to optimum input/output (I/O) processing.

5. Then method of claim 1, wherein said dynamically varying the number of multiple read-ahead streams or said prefetch horizon comprises monitoring periodically system processing conditions including one or more of a number of reads and writes, the central processing unit (CPU) usage, and disk or input/output (I/O) responses within a predetermined period of time, and dynamically varying to afford optimum system processing.

6. The method of claim 5, wherein said dynamically varying comprises varying the number of internal multiple streams accessing data from a single accessing stream to a number of multiple accessing streams to maintain said system processing conditions within predetermined limits.

7. The method of claim 1, wherein said dynamically varying comprises periodically testing for compliance of said processing conditions and said preselected criteria with predetermined thresholds, and upon said processing conditions or one or more of said preselected criteria failing to satisfy said predetermined thresholds, backing off said multiple stream reading, and setting a retry time interval before re-testing for compliance with said predetermined thresholds to renew multiple stream reading.

8. The method of claim 7, wherein said setting a retry time interval comprises setting a back-off factor, n, and a retry time unit, t, and setting said retry time as n*t, where said back-off factor, n, is an integer that increments each time a retry fails to satisfy said predetermined thresholds, and the retry time unit, t, is a fixed unit of time.

9. A non-transitory computer readable storage medium embodying executable instructions for controlling a processor of a data storage system to perform a method of optimizing access time of sequential data in a file stored in said system in response to an external read request for a data restore, comprising:
opening multiple internal read-ahead streams that read ahead in parallel data in increments of a chunk of said file in said storage layer to prefetch said data;
dynamically varying, to optimize processing and speed of said data access, the number of said multiple read-ahead streams that read said data or a prefetch horizon of the data read by each of said multiple read-ahead streams based upon the present system processing conditions and based upon a set of preselected criteria applicable to characteristics of the file being read;
populating a cache with the data read by said multiple read-ahead streams; and
servicing said external read request with the data populated in the cache.

10. The non-transitory computer readable storage medium of claim 9 further comprising confirming prior to opening said multiple read-ahead streams that the size of said file being accessed is greater than a predetermined threshold size below which the costs of setting up said multiple read-ahead stream access exceed the performance benefit obtained from multiple read-ahead stream access.

11. The non-transitory computer readable storage medium of claim 9, wherein said preselected criteria include said file data being stored in a storage tier having an input/output (I/O) bandwidth that is smaller than one at which the processing resource costs required for multiple stream reading exceed the performance benefit obtained.

12. The non-transitory computer readable storage medium of claim 9, wherein said present system processing conditions comprise a system processing load below a predetermined threshold load corresponding to said optimum processing.

13. The non-transitory computer readable storage medium of claim 9, wherein said dynamically varying the number of read-ahead streams or said prefetch horizon comprises periodically monitoring system processing conditions including one or more of a number of reads and writes, the central processing unit (CPU) usage, and disk or input/output (I/O) responses, and dynamically varying to afford optimum system processing.

14. The non-transitory computer readable storage medium of claim 13, wherein said dynamically varying comprises changing the number of internal multiple streams accessing data from a single stream to a number of multiple streams to maintain said system processing conditions within predetermined limits.

15. The non-transitory computer readable storage medium of claim 9, wherein said dynamically varying comprises periodically testing for compliance of said processing conditions and said preselected criteria with predetermined thresholds, and upon said processing conditions or one or more of said preselected criteria failing to satisfy said predetermined thresholds, backing off said multiple stream reading, and setting a retry time interval before re-testing for compliance with said predetermined thresholds to renew multiple stream reading.

16. The non-transitory computer readable storage medium of claim 15, wherein said setting a retry time interval comprises setting a back-off factor, n, and a retry time unit, t, and setting said retry time as n*t, where said back-off factor, n, is an integer that increments each time a retry fails to satisfy said predetermined thresholds, and the retry time unit, t, is a fixed unit of time.

* * * * *